United States Patent
Chiu

(10) Patent No.: US 11,230,343 B2
(45) Date of Patent: Jan. 25, 2022

(54) LOCKING DEVICE FOR SCOOTER WHEN BEING TELESCOPICALLY COLLAPSED

(71) Applicant: WU'S TECH CO., LTD., Hsinchu (TW)

(72) Inventor: Chien-Liang Chiu, Taipei (TW)

(*) Notice: Subject to any disclaimer, the term of this patent is extended or adjusted under 35 U.S.C. 154(b) by 62 days.

(21) Appl. No.: 16/598,712

(22) Filed: Oct. 10, 2019

(65) Prior Publication Data

US 2020/0207437 A1    Jul. 2, 2020

(30) Foreign Application Priority Data

Dec. 26, 2018  (TW) .................................. 107147177

(51) Int. Cl.
*B62K 15/00*  (2006.01)

(52) U.S. Cl.
CPC ........ *B62K 15/006* (2013.01); *B62K 2202/00* (2013.01)

(58) Field of Classification Search
CPC .. B62K 15/006; B62K 2202/00; B62K 15/00; B62K 5/01; B62K 3/002; B62K 5/003
See application file for complete search history.

(56) References Cited

U.S. PATENT DOCUMENTS

| | | | | |
|---|---|---|---|---|
| 4,821,832 A * | 4/1989 | Patmont | ................. | B62K 3/002 180/208 |
| 8,413,753 B2 * | 4/2013 | Wu | ....................... | B62K 19/36 180/208 |
| 2008/0309046 A1 | 12/2008 | Wang | | |
| 2012/0256386 A1 * | 10/2012 | Benarrouch | ........... | B62K 21/12 280/87.05 |
| 2012/0292882 A1 * | 11/2012 | Ghisolfi | ............... | B62K 15/006 280/287 |
| 2018/0346053 A1 * | 12/2018 | Ahrens | .................... | B62K 5/06 |
| 2019/0023347 A1 * | 1/2019 | Block | .................... | B62K 5/025 |

FOREIGN PATENT DOCUMENTS

| | | |
|---|---|---|
| CN | 204713300 U | 10/2015 |
| CN | 205801364 U | 12/2016 |
| CN | 106005169 B | 7/2018 |
| JP | H04244494 A | 9/1992 |

* cited by examiner

*Primary Examiner* — Darlene P Condra
(74) *Attorney, Agent, or Firm* — Egbert, McDaniel & Swartz, PLLC

(57) ABSTRACT

A locking device is provided for a scooter when being telescopically collapsed to lock the steering shaft when being folded and to lock a telescopic front frame when being telescopically collapsed. The locking device includes a steering shaft locking unit is coupled to a pivot seat of a telescopic front frame and a pivot portion of the steering shaft. The steering shaft locking unit is at least provided to hold the steering shaft in place when being in a horizontally folded mode. A front frame telescopically collapsed locking unit includes a first positioning portion disposed on a shank section of the steering shaft and a second positioning portion disposed on one of a rear frame and a foldable seat. The first positioning portion and the second positioning portion are engaged to each other for positioning the telescopically collapsed front frame when the steering shaft is in a horizontally folded mode.

6 Claims, 8 Drawing Sheets

LOCKING DEVICE FOR SCOOTER WHEN BEING TELESCOPICALLY COLLAPSED

STATEMENT REGARDING FEDERALLY SPONSORED RESEARCH OR DEVELOPMENT

Not applicable.

CROSS-REFERENCE TO RELATED U.S. APPLICATIONS

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an innovative locking device for a scooter when being telescopically collapsed.

2. Description of Related Art Including Information Disclosed Under 37 CFR 1.97 and 37 CFR 1.98

The vehicle body of the known scooters is usually folded to reduce the volume, which is to say, the center section of vehicle body is provided with a hinge, so that the front portion and rear portion of vehicle body can be folded via the hinge, so as to reduce the volume of vehicle body. Certainly, the folded state must be combined with a locking component for steady positioning.

The scooter body volume-reduced form to be discussed in the present invention refers to a horizontally extended axial telescopically collapsed form between the front and rear vehicle bodies. A mutually inserted slide fit of inner and outer tube supports is usually used between the front and rear vehicle bodies of this type of scooter, forming the structural feature that the vehicle body length is changed by horizontal telescoping, so that the front and rear vehicle bodies can be telescopically collapsed. However, this known structure still has some defects in practical application. It may because in order to position the sliding telescoping state of the inner and outer tube supports, the circle usually fixes a locking device in at least a position of the outer tube support. However, besides the front and rear vehicle bodies, the scooter volume reducing structures include the steering shaft, the seat and so on. Therefore, if each structure is provided with an independent locking device, the components will be too complex, the operation is inconvenient.

BRIEF SUMMARY OF THE INVENTION

The primary object of the present invention is to provide a locking device for scooter when being telescopically collapsed. The locking device for telescopically collapsed state is disposed on the scooter structure for locking the steering shaft of the scooter when being folded and the telescopic front frame when being telescopically collapsed. The scooter comprises a rear frame and a telescopic front frame arranged on a horizontal axis. The rear frame is provided with a foldable seat. The telescopic front frame can optionally slide to extend or shorten along the horizontal axis against the telescopic front frame. The steering shaft comprises a handlebar, a pivot portion and a shank section. The pivot portion is pivoted on the pivot seat of the telescopic front frame, so that the steering shaft can optionally swing up and down along the horizontal axis, forming an upright operating mode and a horizontally folded mode.

Based on said purpose, the technical characteristics of problem solving of the present invention are that said locking device for telescopically collapsed state comprises a steering shaft locking unit, which is coupled to a pivot seat of a telescopic front frame and a pivot portion of the steering shaft, the steering shaft locking unit is at least provided to hold the steering shaft in place when being in a horizontally folded mode; a front frame telescopically collapsed locking unit, which includes a first positioning portion disposed on a shank section of the steering shaft and a second positioning portion disposed on one of a rear frame and a foldable seat, when the steering shaft is in a horizontally folded mode, the first positioning portion and the second positioning portion are engaged to each other for positioning the telescopically collapsed front frame.

In terms of the effects and advantages of the present invention, based on the locking device for telescopically collapsed state, the folded steering shaft can fix and restrain the telescopic front frame when being telescopically collapsed, effectively preventing the telescopic front frame from slipping forward, and the front frame telescopically collapsed locking unit comprises the first positioning portion of the shank section of steering shaft and the second positioning portion disposed on one of a rear frame and a foldable seat, the structure is very simple and easy to be manufactured and assembled. Therefore, said locking device for telescopically collapsed state of the present invention has such practical progressiveness and better industrial economic benefit as better structure locking effect, simple positioning structure and lower manufacturing cost.

DETAILED DESCRIPTION OF THE INVENTION

Figure 7:
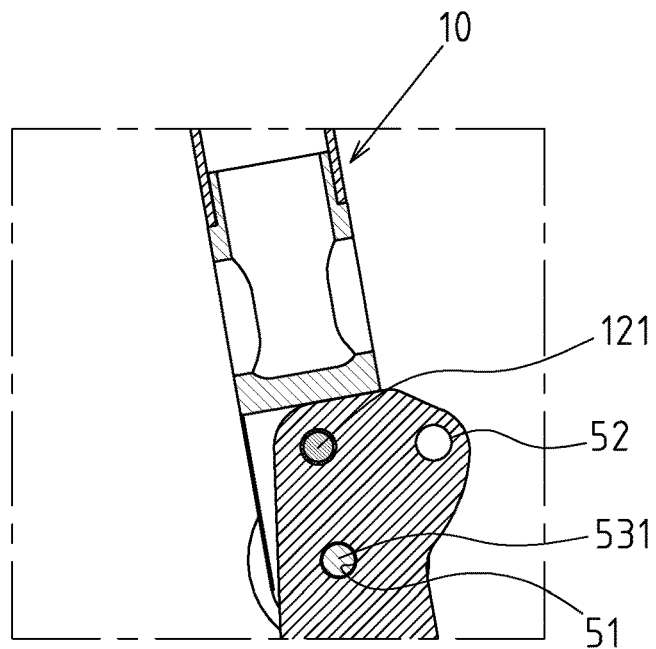
FIG. 7 is the sectional view of the steering shaft of the present invention in upright operating mode.
Figure 8:
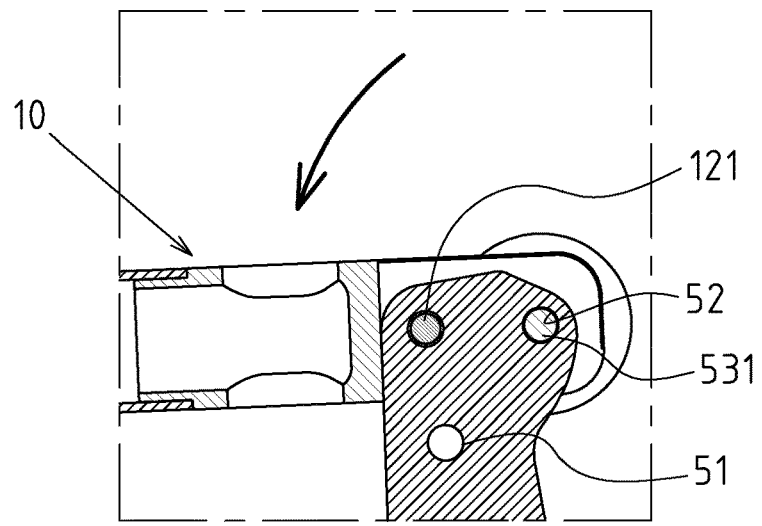
FIG. 8 is the sectional view of the steering shaft of the present invention in horizontally folded mode.

Referring to FIGS. 1 to 13, said locking device for telescopically collapsed state is disposed on a scooter A (an electric scooter in general) structure for locking a steering shaft 10 of the scooter A when being folded and a telescopic front frame 30 when being telescopically collapsed in horizontally axial direction; wherein the scooter A comprises a rear frame 20 and a telescopic front frame 30 arranged along a horizontal axis. The rear frame 20 is provided with a foldable seat 40. The telescopic front frame 30 can optionally slide to extend or shorten along the horizontal axis against the rear frame 20. The steering shaft 10 comprises a handlebar 11, a pivot portion 12 and a shank section 13 between the handlebar 11 and the pivot portion 12. The pivot portion 12 is pivoted on a pivot seat 31 of the telescopic front frame 30 via a pivot 121, so that the steering shaft 10 can optionally swing up and down along the horizontal axis, forming an upright operating mode (as shown in FIG. 7) and a horizontally folded mode (as shown in FIG. 8). The locking device for telescopically collapsed state comprises a steering shaft locking unit 50, which is coupled to the pivot seat 31 of the telescopic front frame 30 and the pivot portion 12 of the steering shaft 10, the steering shaft locking unit 50 is at least provided to position the steering shaft 10 when being in a horizontally folded mode; a front frame telescopically collapsed locking unit 60, comprising a first positioning portion 61 located in the shank section 13 of the steering shaft 10 and a second positioning portion 62 located in any structure of the rear frame 20 and the foldable seat 40. When the steering shaft 10 is in a horizontally folded mode (as shown in FIGS. 4 and 5), the first positioning portion 61 and the second positioning portion 62 are engaged to each other (as shown in FIG. 6), so as to position the telescopic front frame 30 when being telescopically collapsed in horizontally axial direction.

Based on said structure type and technical characteristics, the present invention uses the locking device for telescopically collapsed state to lock the steering shaft 10 of the scooter A when being folded and the telescopic front frame 30 when being telescopically collapsed in horizontally axial direction, so that the folded steering shaft 10 can fix and restrain the telescopic front frame 30 when being telescopically collapsed in horizontally axial direction, effectively preventing the telescopic front frame 30 from slipping forward, and the front frame telescopically collapsed locking unit 60 comprises a first positioning portion 61 of the shank section 13 of steering shaft 10 and a second positioning portion 62 located in any structure of a rear frame 20 and a foldable seat 40, the structure is very simple and easy to be manufactured and assembled, so as to implement better structure locking effect and simplify the positioning structure, the manufacturing cost is reduced. Moreover, when the steering shaft 10 is locked in folded state, the shank section 13 can form a carrying handle part for the user to lift the whole scooter?.

Figure 1:
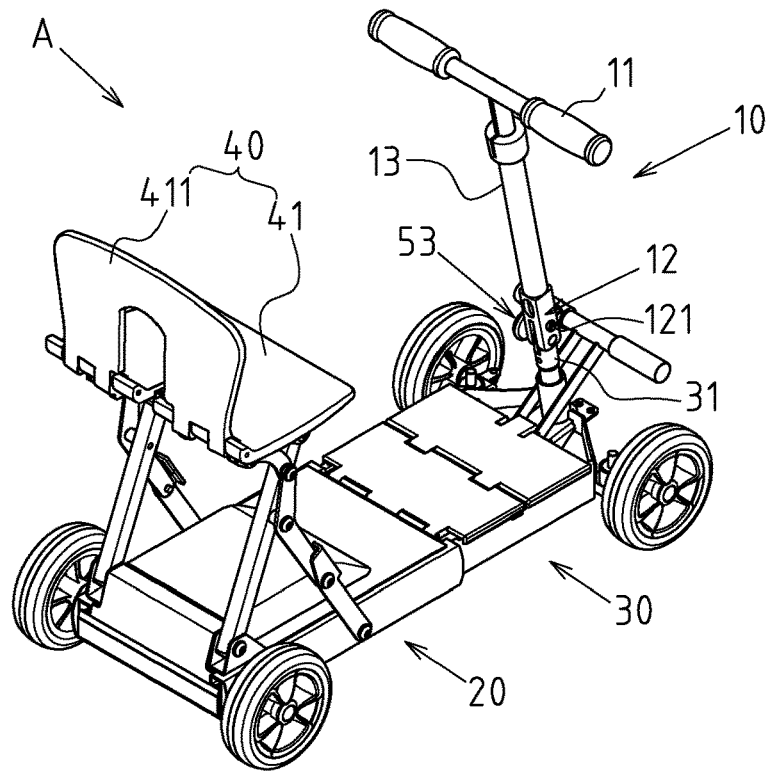
FIG. 1 is the combined stereogram of the preferred embodiment of the present invention.
Figure 2:
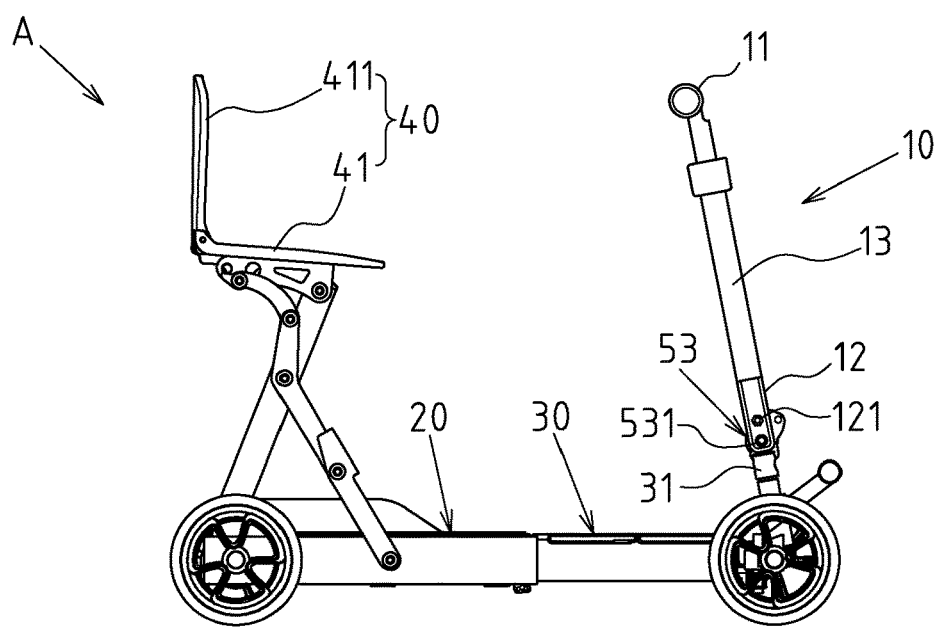
FIG. 2 is the combined side view of the preferred embodiment of the present invention.
Figure 3:
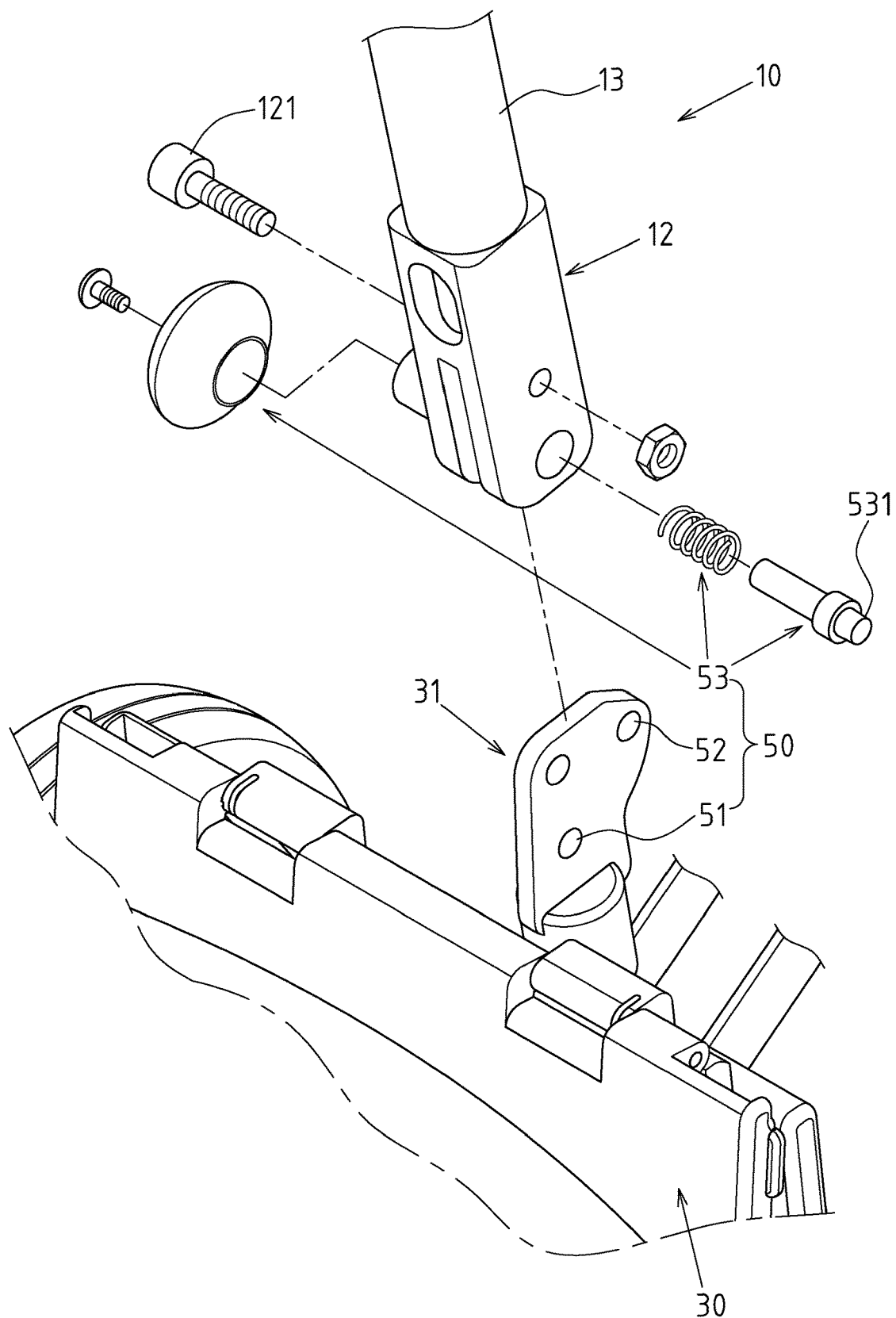
FIG. 3 is the partially exploded view of the preferred embodiment of the present invention.
Figure 9:
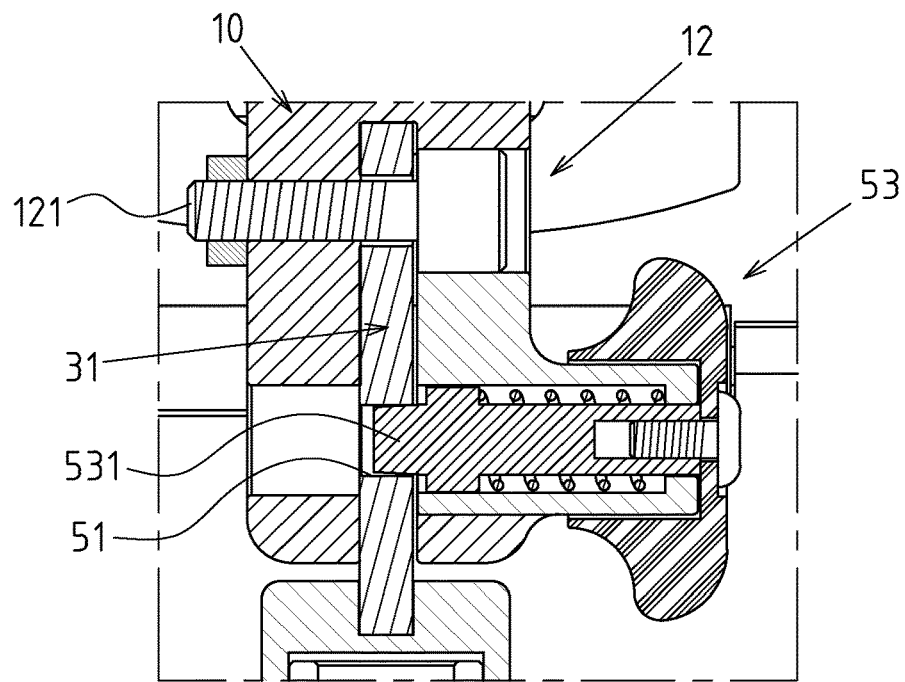
FIG. 9 is the sectional view of the locking component of the present invention in lock status.
Figure 10:
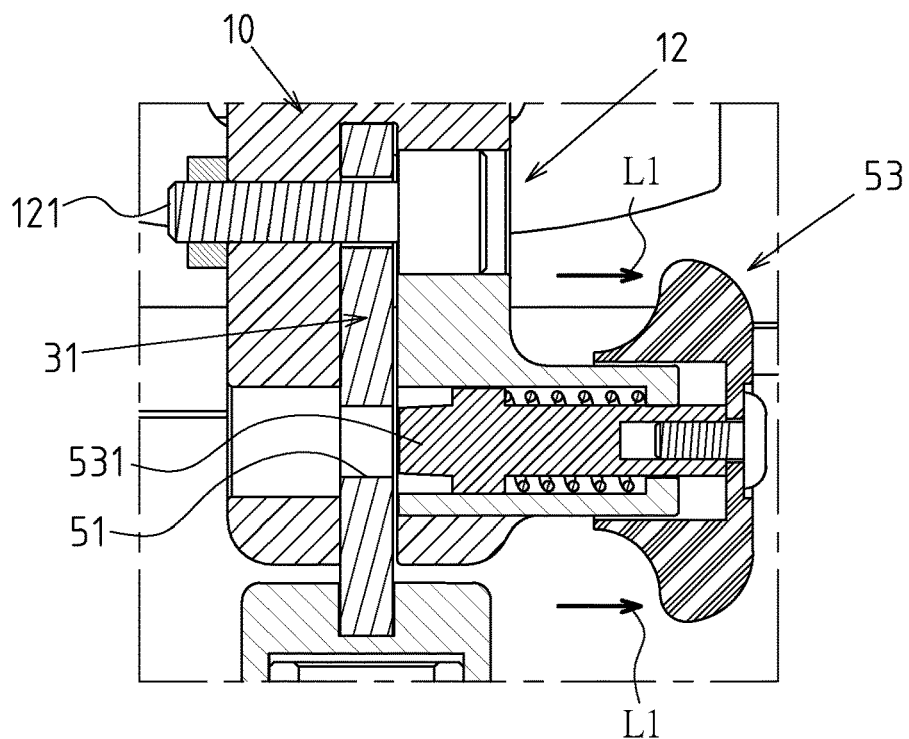
FIG. 10 is the sectional view of the locking component of the present invention in released state.

As shown in FIG. 3, in this case, the steering shaft locking unit 50 comprises an upright mode locating hole 51 and a horizontal mode locating hole 52 in different positions in the pivot seat 31 structure of the telescopic front frame 30, and a locking component 53 located in the pivot portion 12 of the steering shaft 10. The locking component 53 has an inserted link part 531, when the steering shaft 10 is in upright operating mode, as shown in FIG. 7, the inserted link part 531 is inserted in the upright mode locating hole 51; when the steering shaft 10 is in horizontally folded mode, as shown in FIG. 8, the inserted link part 531 is inserted in the horizontal mode locating hole 52, so that the steering shaft 10 can be positioned when it is in upright operating mode and horizontally folded mode. The locking component 53 on the pivot portion 12 structure of the steering shaft 10 is any form of a spring location column (also known as index pin) and a latch. In this case, a spring location column is used as the locking component 53, as shown in FIG. 9, the steering shaft 10 is in upright operating mode, the inserted link part 531 of locking component 53 is inserted in the upright mode locating hole 51 and locked. as shown in FIG. 10, when the user wants to adjust the mode of steering shaft 10, the locking component 53 can be pulled (Arrow L1) to disengage the inserted link part 531 from the upright mode locating hole 51, the steering shaft 10 is released, and then it can be swung.

Figure 4:
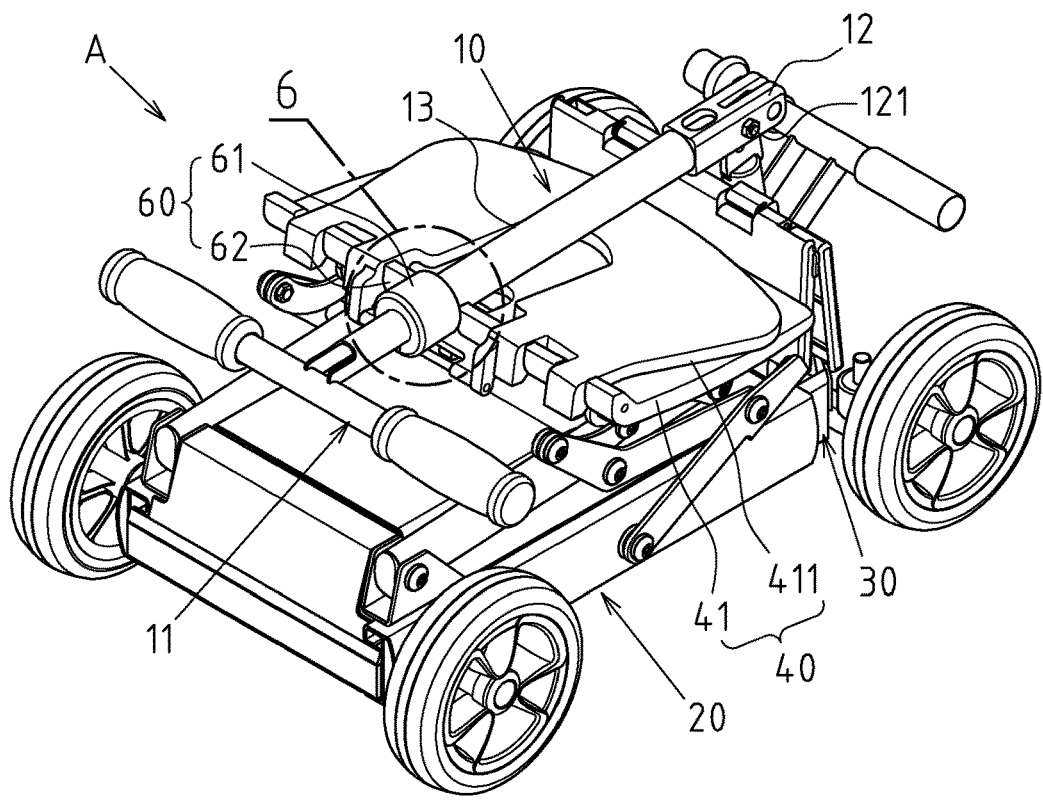
FIG. 4 is the combined stereogram of the folded scooter of the present invention.
Figure 5:
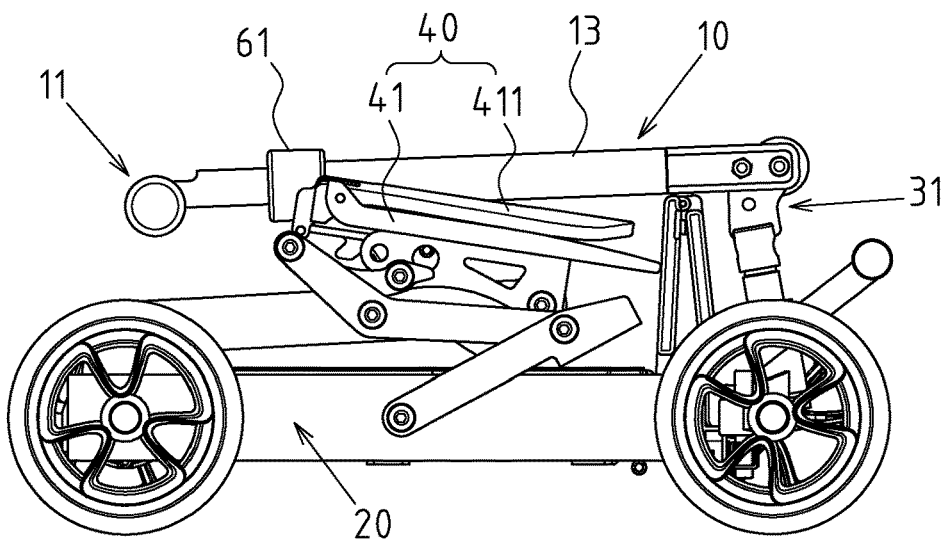
FIG. 5 is the combined side view of the folded scooter of the present invention.
Figure 6:
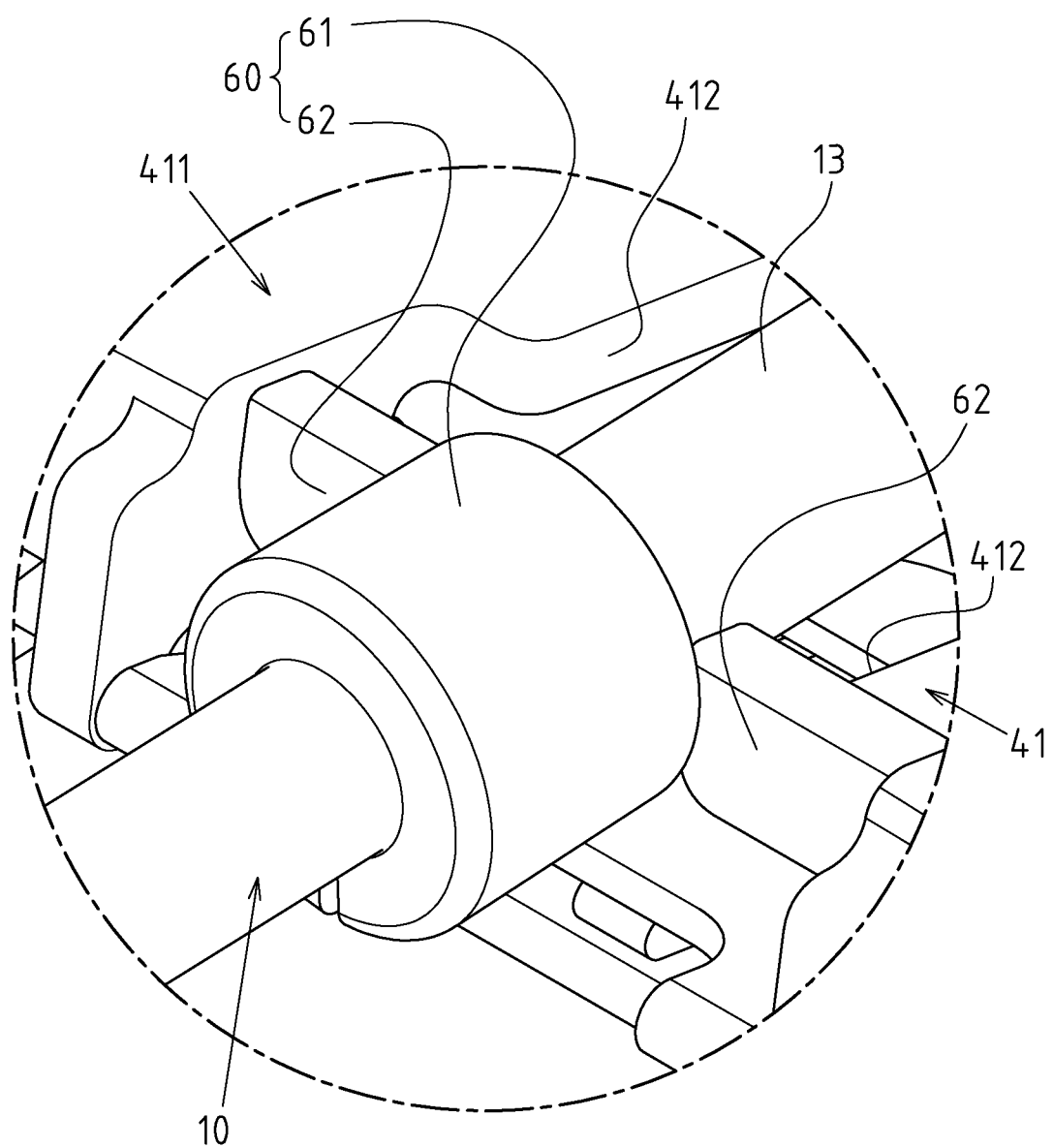
FIG. 6 is the close-up view of FIG. 4.

As shown in FIGS. 4 to 6, in this case, the first positioning portion 61 of the front frame telescopically collapsed locking unit 60 is a projecting ring piece (e.g. a plastic ring or a metal ring) fitted over the shank section 13 of the steering shaft 10. The foldable seat 40 includes a seat pad 41, the second positioning portion 62 comprises two wall margins on the rear side edge of the seat pad 41. When the steering shaft 10 is in horizontally folded mode, the height of the first positioning portion 61 of the projecting ring piece is lower than the height of the second positioning portion 62 formed of two wall margins on the rear side edge of the seat pad 41, so that the second positioning portion 62 and the first positioning portion 61 prop each other horizontally. This case describes that the second positioning portion 62 can be directly formed of two wall margins on the rear side edge of the seat pad 41, so it is unnecessary to mount any other components.

Figure 11:
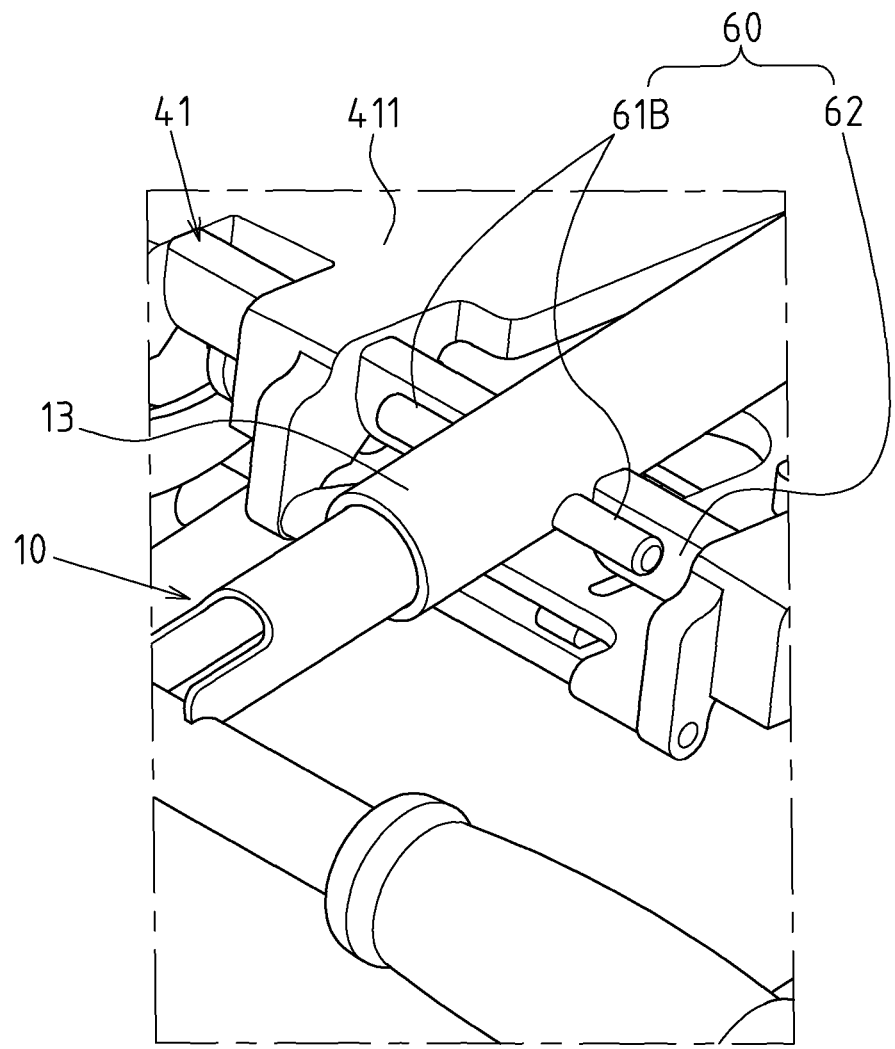
FIG. 11 shows the embodiment of the first positioning portion of the present invention as a projecting object.

As shown in FIG. 11, in this case, the first positioning portion 61B of the front frame telescopically collapsed locking unit 60 is at least a projecting object form on circumferential side edge of the shank section 13 of the steering shaft 10 (a rigid convex pin or a lug, two convex pins in this case). The second positioning portion 62 comprises two wall margins on the rear side edge of the seat pad 41. When the steering shaft 10 is in horizontally folded mode. The height of the first positioning portion 61B of the projecting object form is lower than the height of the second positioning portion 62 formed of two wall margins on the rear side edge of the seat pad 41, so that the second positioning portion 62 and the first positioning portion 61B prop each other horizontally. This case describes that the first positioning portion 61 is not limited to said ring piece form, it can be the first positioning portion 61B disclosed in this case, which is at least a projecting object form on the circumferential side edge of the shank section 13 of the steering shaft 10.

As shown in FIGS. 4 and 6, in this case, a seat back 411 is disposed on the rear side edge of the seat pad 41. The seat pad 41 and the seat back 411 are provided with a concave edge 412 respectively. When the steering shaft 10 is in horizontally folded mode, the shank section 13 of the steering shaft 10 at least partially falls into the two concave edges 412. The technical feature of the seat pad 41 and seat back 411 with the concave edges 412 disclosed in this case allows the shank section 13 of steering shaft 10 to partially or fully get in, the height of the folded steering shaft 10 is further reduced, the overall volume of the scooter A in folded state can be further reduced.

Figure 12:
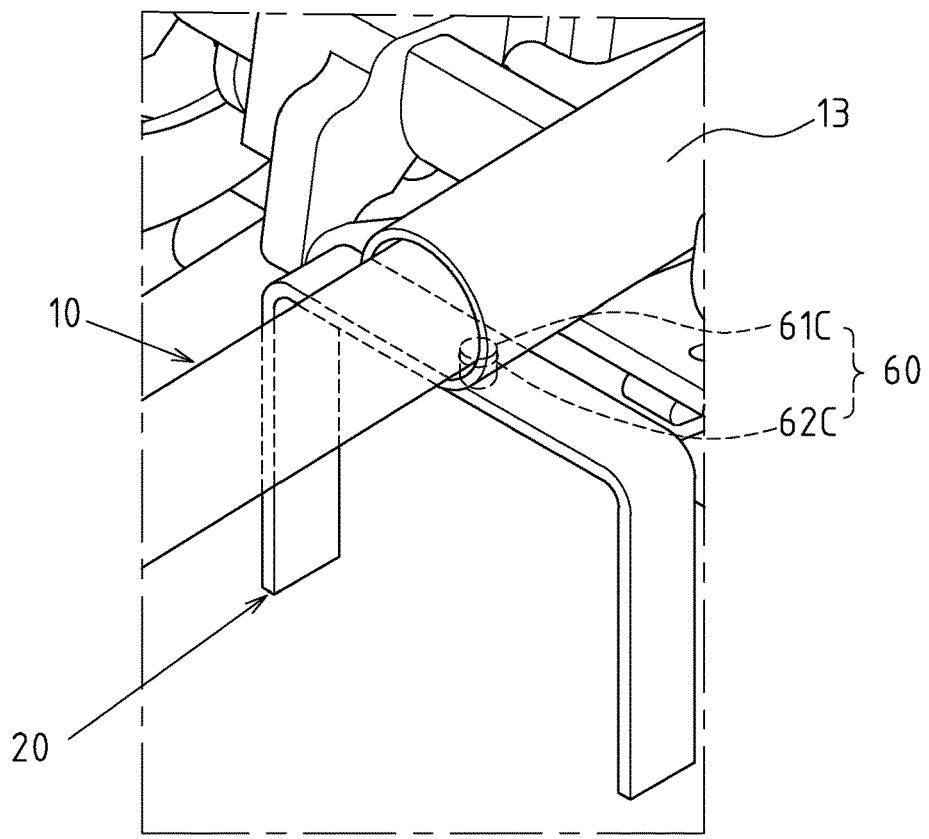
FIG. 12 shows another embodiment of the first and second positioning portions of the present invention in fitted form.
Figure 13:
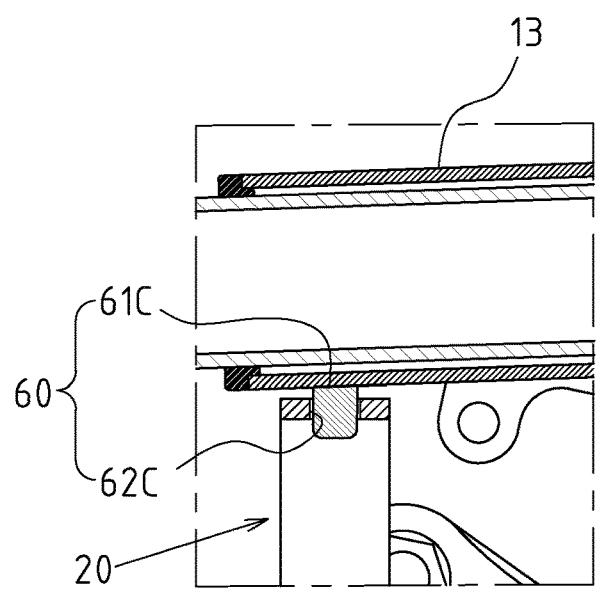
FIG. 13 is the sectional view of local structure corresponding to the state disclosed in FIG. 12.

As shown in FIGS. 12 and 13, in this case, the first positioning portion 61C of the front frame telescopically collapsed locking unit 60 is a projecting object form located at one side of periphery of the shank section 13 of the steering shaft 10; and the second positioning portion 62C is any form of a recess or a hole in the rear frame 20 structure. This implementation pattern describes that the second positioning portion 62 is not limited to the form on the seat pad 41 structure of scooter A disclosed above, it can be the implementation pattern on the rear frame 20 structure disclosed in this case.

I claim:

1. An apparatus comprising:
a scooter having a rear frame and a telescopic front frame arranged along, a horizontal axis, the rear frame having a foldable seat, the telescopic front frame being slidable in order to lengthen or shorten along a horizontal axis relative to the rear frame, said scooter having a steering shaft having a handlebar and a pivot portion and a shank section, the shank section located between the handlebar and the pivot portion, the pivot portion being pivotable via a pivot on a pivot seat of the telescopic front frame such that the steering shaft is swingable upwardly and downwardly along the horizontal axis so as to define an upright operating mode and a horizontally folded mode;
a steering shaft locking unit coupled to the pivot seat of the telescopic front frame and to the pivot portion of the steering shaft, said steering shaft locking unit positioning the steering shaft in the horizontally folded mode; and
a front frame telescopically collapsed locking unit having a first positioning portion disposed on the shank section of the steering shank away from the handlebar and a second positioning portion located in the rear frame of the foldable seat, the first positioning portion and the second positioning portion bearing against each other when the steering shaft is in the horizontally folded mode so as to position the telescopic front frame when telescopically collapsed in a horizontally axial direction, wherein the first positioning portion of said front frame telescopically collapsed locking unit is a projecting ring piece fitted over the shank section of the steering shaft, wherein the foldable seat has a seat pad, wherein the second positioning portion is a wall at a rear side of the seat pad, the height of the first positioning portion of the projecting ring piece is less than a height of the second positioning portion when the steering shaft is in the horizontally folded mode such that the second positioning portion and the first positioning portion bear against each other horizontally.

2. The apparatus of claim 1, wherein said steering shaft locking unit has an upright mode locating hole and a horizontal mode locating hole in different positions in the pivot seat of the steering shaft and a locking component positioned in the pivot portion of the steering shaft, wherein the locking component has an inserted link, the inserted link being inserted in the upright mode locating hole when the steering shaft is in the upright operating mode, the inserted link being inserted in the horizontal mode locating hole when the steering shaft is in the horizontally folded mode.

3. The apparatus of claim 2, wherein the locking component is a spring column.

4. The apparatus of claim 1, wherein the foldable seat has a seat back disposed at a rear side of a seat pad, the seat pad and the seat back each having a concave edge, wherein the shank section of the steering shaft is at least partially positioned in the concave edges of the seat pad and the seat back when the steering shaft is in the horizontally folded mode.

5. An apparatus comprising:
a scooter having a rear frame and a telescopic front frame arranged along a horizontal axis, the rear frame having a foldable seat, the telescopic front frame being slidable in order to lengthen or shorten along a horizontal axis relative to the rear frame, said scooter having a steering shaft having a handlebar and a pivot portion and a shank section, the shank section located between the handlebar and the pivot portion, the pivot portion being pivotable via a pivot on a pivot seat of the telescopic front frame such that the steering shaft is swingable upwardly and downwardly along the horizontal axis so as to define an upright operating mode and a horizontally folded mode;
a steering shaft locking unit coupled to the pivot seat of the telescopic front frame and to the pivot portion of the steering shaft, said steering shaft locking unit positioning the steering shaft in the horizontally folded mode; and
a front frame telescopically collapsed locking unit having a first positioning portion disposed on the shank section of the steering shank away from the handlebar and a second positioning portion located in the rear frame of the foldable seat, the first positioning portion and the second positioning portion bearing against each other when the steering shaft is in the horizontally folded mode so as to position the telescopic front frame when telescopically collapsed in a horizontally axial direction, wherein the first positioning portion of said front frame telescopically collapsed locking unit is a projection formed on a circumferential side of the shank of the steering shaft, wherein the second positioning portion is a wall at a rear side of the seat pad, a height of the first positioning portion of the projection is less than a height of the second positioning portion at the wall at the rear side of the seat pad when the steering shaft is in the horizontally folded mode such that the first positioning portion and the second positioning portion bear against each other.

6. An apparatus comprising:
a scooter having a rear frame and a telescopic front frame arranged along a horizontal axis, the rear frame having a foldable seat, the telescopic front frame being slidable in order to lengthen or shorten along a horizontal axis relative to the rear frame, said scooter having a steering shaft having a handlebar and a pivot portion and a shank section, the shank section located between the handlebar and the pivot portion, the pivot portion being pivotable via a pivot on a pivot seat of the telescopic front frame such that the steering shaft is swingable upwardly and downwardly along the horizontal axis so as to define an upright operating mode and a horizontally folded mode;
a steering shaft locking unit coupled to the pivot seat of the telescopic front frame and to the pivot portion of the steering shaft, said steering shaft locking unit positioning the steering shaft in the horizontally folded mode; and
a front frame telescopically collapsed locking unit having a first positioning portion disposed on the shank section of the steering shank away from the handlebar and a second positioning portion located in the rear frame of the foldable seat, the first positioning portion and the second positioning portion bearing against each other when the steering shaft is in the horizontally folded mode so as to position the telescopic front frame when telescopically collapsed in a horizontally axial direction, wherein said steering shaft locking unit has an upright mode locating hole and a horizontal mode locating hole in different positions in the pivot seat of the steering shaft and a locking component positioned in the pivot portion of the steering shaft, wherein the locking component has an inserted link, the inserted link being inserted in the upright mode locating hole when the steering shaft is in the upright operating mode, the inserted link being inserted in the horizontal mode locating hole when the steering shaft is in the horizontally folded mode, wherein the first positioning portion of the front frame telescopically collapsed locking unit is a projection located at one side of a periphery of the shank section of the steering shaft, wherein the second positioning portion is a recess or hole formed in the rear frame.

* * * * *